United States Patent [19]
Heideman

[11] 3,857,405
[45] Dec. 31, 1974

[54] INTERCHANGEABLE RIGHT ANGLE OR INLINE FLOW CONTROL VALVE

[76] Inventor: Robert J. Heideman, 16137 W. Parkway, Detroit, Mich. 48219

[22] Filed: Nov. 30, 1973

[21] Appl. No.: 420,631

[52] U.S. Cl.............. 137/269.5, 137/525, 137/599
[51] Int. Cl........................................... F16k 11/10
[58] Field of Search............... 137/269.5, 513.7, 599

[56] References Cited
UNITED STATES PATENTS

| | | | |
|---|---|---|---|
| 2,922,432 | 1/1960 | Huntington et al.............. | 137/269.5 |
| 3,289,694 | 12/1966 | Frye................................ | 137/599 X |

Primary Examiner—Robert G. Nilson
Attorney, Agent, or Firm—Robert G. Mentag

[57] ABSTRACT

An interchangeable fluid flow control valve which can be used to provide straight through free fluid flow or right angle fluid flow by merely changing the positions of a pair of threadably mounted retainer members. The valve includes a valve body having an outlet port, a first valve chamber in the valve body disposed on an axis perpendicular to the longitudinal axis of the outlet port and having an opening communicating with the exterior of the valve body. A second valve chamber is formed in the valve body in a position inline with the outlet port and it is provided with an opening communicating with the exterior of the valve body. Each of the openings in the valve chambers is of equal size so that they can selectively have mounted therein either a check valve retainer assembly means or a flow control needle valve assembly means. The check valve means is used to provide an inline or right angle free fluid control in either a straight line path through the valve or a right angle path through the valve. The check valve prevents reverse free flow through the valve. The flow control needle valve assembly means provides a second path of controlled rate of flow through the valve, both in the direction of said free fluid flow and also in the reverse direction.

6 Claims, 4 Drawing Figures

PATENTED DEC 31 1974

INTERCHANGEABLE RIGHT ANGLE OR INLINE FLOW CONTROL VALVE

SUMMARY OF THE INVENTION

This invention relates to the valve art, and more particularly to a novel and improved fluid flow control valve.

Heretofore, fluid flow control valves have been provided which may be used to provide free fluid flow in one direction through one flow path in the valve, and a controlled flow in two directions through the valve. However, a disadvantage of such prior art valves is that it is necessary to have different valves if it is desired to have a right angle free fluid flow control system in one instance, and an inline free fluid flow control system in another instance. Accordingly, it is an important object of the present invention to provide a novel and improved interchangeable right angle or inline flow control valve which overcomes the aforementioned disadvantage of the prior art valves.

It is another object of the present invention to provide a novel and improved interchangeable right angle or inline fluid flow control valve which is simple and compact in construction, economical to manufacture, and efficient in operation.

It is a further object of the present invention to provide a novel and improved interchangeable fluid flow control valve which can be used to provide straight through free fluid flow or right angle fluid flow, by merely changing the positions of a pair of threadably mounted retainer members. The valve includes a valve body having an outlet port, a first valve chamber in the valve body disposed on an axis perpendicular to the longitudinal axis of the outlet port and having an opening communicating the first valve chamber to the exterior of the valve body. The valve includes a second valve chamber in the valve body which has a longitudinal axis inline with the longitudinal axis of the outlet port, and an opening communicating the second valve chamber to the exterior of the valve body. Each of the openings communicating said valve chambers to the exterior of the valve body are of equal size. A first flow passage means is formed in the valve body for communicating each of the valve chambers with the outlet port. A second flow passage means is formed in the valve body with a first end communicating with said first valve chamber and a second end communicating with said second valve chamber. A check valve retainer assembly means is selectively mounted in one of the valve chamber openings and extended into the respective chamber for said one opening, and it includes an inlet port communicating with the respective end of said second flow passage means communicating with the last mentioned chamber for conducting fluid into said second flow passage means. The check valve retainer means includes a one-way check valve for controlling flow of fluid from the inlet port into said last mentioned valve chamber, and to check fluid flow from the last mentioned valve chamber into the inlet port. A flow control needle valve assembly means is selectively mounted in the other of said valve chamber openings and extended into the respective chamber for said other opening for operative engagement with the respective end of said second flow passage means communicating with the last mentioned chamber for controlling fluid flow between said second flow passage means and said last mentioned chamber. The valve of the present invention may be used as an inline free fluid flow valve when the check valve retainer assembly means is disposed in said second valve chamber, and as a right angle free fluid flow valve when the check valve retainer assembly means is mounted in the first valve chamber. The valve of the present invention permits the provision of an inline or right angle free fluid flow valve at a lower price than heretofore possible because of the interchangeability of the check valve retainer assembly means and the flow control needle valve assembly means. Furthermore, the distributor in the field need not stock as many parts, and by merely having the standard parts on hand, he can fill orders for inline or right angle free fluid flow valves at a reduced cost. The distributor thus does not have to stock as many parts, and the money he has to invest and the inventory of parts required to be on hand can be reduced to a minimum.

It is still another object of the present invention to provide an interchangeable fluid flow control valve which can be used to provide straight through free fluid flow or right angle free fluid flow, amd which includes a check valve retainer assembly means that includes a one-way dilating O-ring check valve that is operative to check flow of fluid through the valve in a direction opposite to a free fluid flow by seating on a seat which is formed partially from the retainer on which the valve is carried, and partially on an angle faced valve seat formed in the valve body.

Other objects, features and advantages of this invention will be apparent from the following detailed description, appended claims, and the accompanying drawings.

DESCRIPTION OF THE PREFERRED EMBODIMENT

Figure 1:
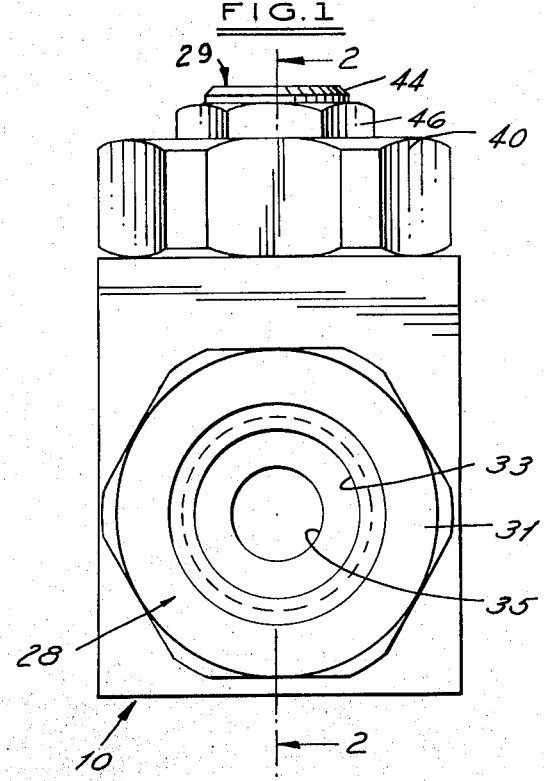
FIG. 1 is an end elevational view of an interchangeable right angle or inline flow control valve made in accordance with the principles of the present invention.
Figure 2:
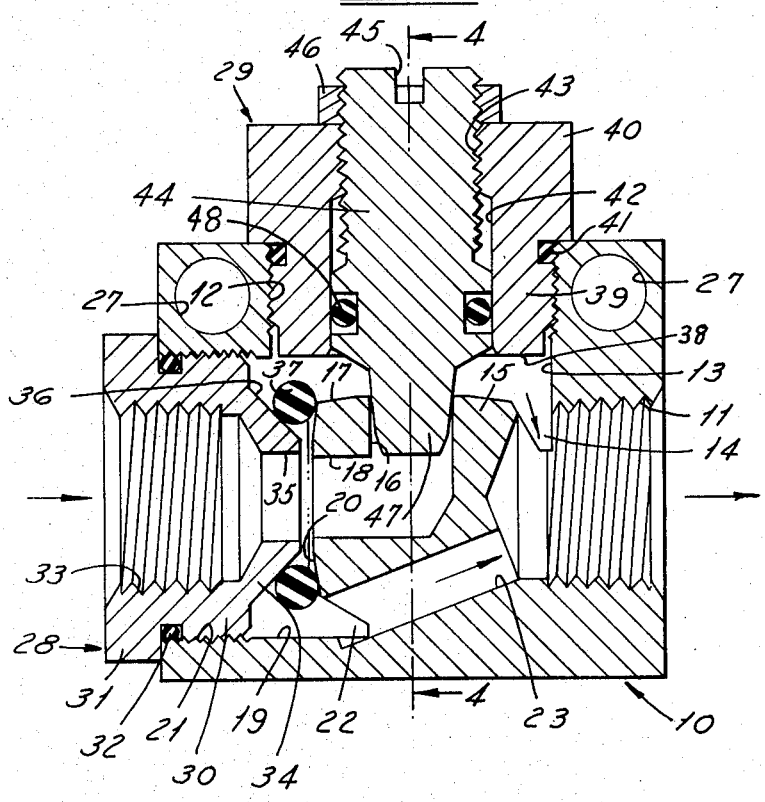
FIG. 2 is an elevational section view of the valve structure illustrated in FIG. 1, taken along the line 2—2 thereof, looking in the direction of the arrows, and showing the valve of the present invention employed as an inline flow control valve.
Figure 4:
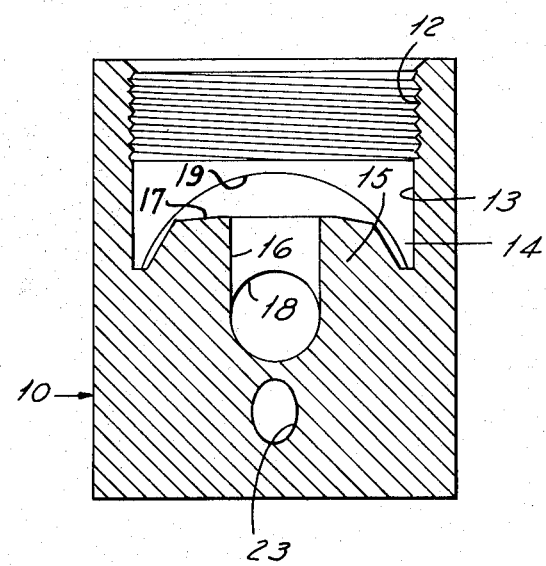
FIG. 4 is an elevational section view of the structure illustrated in FIG. 2, with the needle valve assembly means removed, taken along the line 4—4 thereof, and looking in the direction of the arrows.

Referring now to the drawings, and in particular to FIGS. 1, 2 and 4, the numeral 10 generally designates a block shaped valve body which is provided with a threaded outlet port 11 (FIG. 2) on one end thereof.

As shown in FIG. 2, a threaded bore 12 is formed in the body 10 on the top side thereof, and at right angles to the outlet port 11. The threaded bore 12 communicates with a first valve chamber 13 which communicates through a semicircular flow passage 14 with the outlet port 11.

As shown in FIG. 2, a second threaded bore 21 is formed in the block 10, on the end of the block opposite to the outlet port 11 and in axial alignment therewith. The threaded bore 21 communicates with a second valve chamber 19. The second valve chamber 19 communicates through a semicircular flow passage 22, and a bore or flow passage 23, with the outlet port 11.

As seen from FIGS. 2 and 4, the valve chambers 13 and 19, and the flow passages 14 and 22 function to form in the body 10 an integral double faced valve seat member 15, provided with two valve seats which are disposed at right angles to each other, with one valve seat facing the threaded bore 12 and the other valve seat facing the threaded bore 21. A first bore or flow passage 16 is formed through the valve seat member 15, from the one valve seat facing the bore 12, and in axial alignment with the bore 12. Passage 16 extends inwardly into the integral valve seat member 15 and it communicates at its inner end with the inner end of a second bore or flow passage 18 which is extended inwardly in the integral valve seat member 15 from the other valve seat facing the threaded bore 21. The valve seat facing the threaded bore 12 is provided with a ring shaped outwardly tapered valve seat 17 which is formed at an angle of preferably 5° from a plane perpendicular to the longitudinal axis of the bores 12 and 16. The other valve seat is also provided with an angled or tapered valve seat indicated by the numeral 20 which is also disposed at an angle of preferably 5° from a plane perpendicular to the axis of the bores 18 and 21.

As shown in FIG. 2, the valve body 10 is provided with a pair of mounting holes 27 for mounting the valve on a machine tool, or the like, which is to include the valve as a part of its fluid operating system.

As shown in FIGS. 1 and 2, the numeral 28 generally designates an O-ring check valve retainer assembly means which is threadably mounted in the threaded bore 21 leading to the second valve chamber 19. The numeral 29 generally designates a needle valve assembly means which is threadably mounted in the threaded bore 12 leading to the first valve chamber 13.

The structure of FIGS. 1 and 2 provides an inline valve adapted for use with any type fluid, as for example air, oil or water. As shown in FIG. 2, the O-ring check valve retainer assembly means 28 includes a retainer having a threaded body 30 which is threadably mounted in the threaded bore 21 and which is provided on its outer end with a flange 31. An O-ring 32 is operatively mounted between the retainer body 30 and the valve body 10.

The O-ring check valve retainer body 30 is provided with an axially disposed port 33 which is threaded and extends inwardly from the outer end of the retainer body. The inner end of the O-ring check valve retainer body 30 is provided with a conical or tapered shape, designated by the numeral 34, which has an axial bore 35 formed therethrough that communicates at its inner end with the inlet port 33 and at its outer end with the valve chamber 19. The outer conical surface 36 on the retainer body inner end 34 forms a valve seat on which is seated a dilating O-ring check valve, designated by the numeral 37. In the closed position shown in FIG. 2, the O-ring check valve 37 seats against the tapered or conical valve seat 36 and against the valve seat 20 formed on the valve seat member 15.

As shown in FIG. 2, the needle valve assembly means 29 includes a retainer having a threaded body 39 which is threadably mounted at its inner end in the threaded bore 12 in the valve body 10, and which is provided on its outer end with a flange 40. The inner end of the retainer body 39 is indicated by the numeral 38 and it is formed perpendicular to the longitudinal axis of the retainer body 39. An O-ring seal 41 is operatively mounted between the retainer body 39 and the threaded bore 12. Extending inwardly from the inner end 38 of the needle valve retainer body 39 is a smooth-faced needle valve bore or cylindrical chamber 42. The outer end of the chamber 42 communicates with a threaded bore 43 that extends through the outer flanged end 40 of the needle valve retainer.

A needle valve is operatively carried in the needle valve retainer body 39, and it includes a threaded cylindrical body 44 which is threadably mounted in the threaded bore 43 and adapted to be secured in an adjusted position by a lock-nut 46. The outer end of the needle valve body 44 is provided with a cross slot 45 for the reception of a screwdriver or the like for adjusting the position of the needle valve in the needle valve retainer. The inner end of the needle valve body 44 is provided with a cylindrival outer surface which slidably engages the surface of the cylindrical chamber 42 for sliding engagement therewith, and it also carries an O-ring seal 48 that engages the surface of the chamber 42. A conically shaped needle valve nose 47 is provided on the inner end of the valve body 44.

In use, the valve of the present invention may be used to control the flow of any type of fluid, as for example, air, oil, or water. The structure of the valve illustrated in FIG. 2 provides an inline free fluid flow wherein the fluid entering the valve through the inlet port 33 at a predetermined pressure will expand the O-ring check valve 37 radially outwardly to permit free flow of fluid through the chamber 19, the chamber 13, and the passages 23 and 14, and thence out the outlet port 11. When the pressure entering the inlet port 33 is reduced to a predetermined pressure, the check valve 37 will retract to its closed position, as shown in FIG. 2, to prevent further free flow of fluid through the valve. However, it will be seen that a controlled flow of fluid through the passage formed by the bores 16 and 18 may be provided by adjusting the needle valve 44 outwardly to a predetermined position to permit flow thereby, and thence into the valve chamber 13 and through the passage 14 and out the outlet port 11. The needle valve 44 is shown in the closed position in FIG. 2, and it will be understood that it could be adjusted outwardly and secured in position by the lock nut 46.

Figure 3:
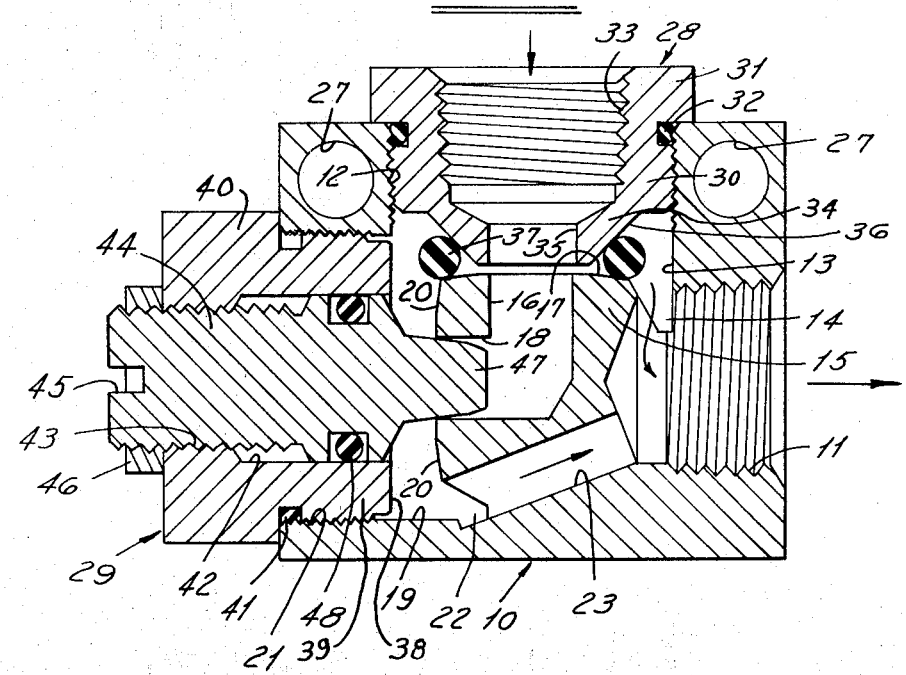
FIG. 3 is an elevational section view similar to FIG. 2, and showing the valve of the present invention employed as a right angle flow control valve.

FIG. 3 shows the reversal of the position of the check valve retainer assembly means 28 and the flow control needle valve assembly means 29 so as to provide a right angle free flow through the valve.

While it will be apparent that the preferred embodiment of the invention herein disclosed is well calculated to fulfill the objects above stated, it will be appreciated that the invention is suceptible to modification, variation and change.

What is claimed is:

1. In an interchangeable fluid flow control valve, the combination comprising:

a. a valve body having an outlet port with a longitudinal axis;

b. a first valve chamber in said valve body and having a longitudinal axis perpendicular to the longitudinal axis of said outlet port and an opening communicating the first valve chamber to the exterior of the valve body;

c. a second valve chamber in said valve body and having a longitudinal axis inline with the longitudinal axis of said outlet port and an opening communicating the second valve chamber to the exterior of the valve body;

d. each of said openings communicating said valve chambers to the exterior of the valve body being of equal size;

e. a first flow passage means formed in said valve body for communicating each of said valve chambers with said outlet port;

f. a second flow passage means formed in said valve body with a first end communicating with said first valve chamber and a second end communicating with said second valve chamber;

g. a check valve retainer assembly means, selectively mounted in one of said valve chamber openings and extended into the respective chamber for said one opening, and including an inlet port communicating with the respective end of said second flow passage means communicating with the last mentioned chamber for conducting fluid into said second flow passage means;

h. said check valve retainer assembly means including a one-way check valve for controlling flow of fluid from said inlet port into said last mentioned valve chamber and to check fluid flow from said last mentioned valve chamber into said inlet port; and, i. a flow control needle valve assembly means selectively mounted in the other of said valve chamber openings and extended into the respective chamber for said other opening for operative engagement with the respective end of said second flow passage means communicating with the last mentioned chamber for controlling fluid flow between said second flow passage means and said last mentioned chamber.

2. An interchangeable fluid flow control valve as defined in claim 1, wherein:

a. said one-way check valve comprises a dilating O-ring check valve, which is normally in a closed position and expandable by fluid under a predetermined pressure entering said inlet port to allow said fluid to flow from the inlet port into the chamber in which the check valve retainer assembly is mounted.

3. An interchangeable fluid flow control valve as defined in claim 2, wherein:

a. said valve body includes a valve seat member through which said second flow passage means is formed, and which is provided with a first valve seat formed on one side thereof and facing said first valve chamber, and a second valve seat formed on another side thereof and facing said second valve chamber;

b. said first end of said second flow passage means being disposed in a position within and concentric to said first valve seat, and the second end of said second flow passage means being disposed in a position within and concentric to said second valve seat; and, c. said O-ring check valve being operatively mounted on said check valve retainer assembly means so as to be operatively seated against the valve seat, which faces the valve chamber in which the check valve retainer assembly means extends, when it is disposed in a normally closed position.

4. An interchangeable fluid flow control valve as defined in claim 3, wherein:

a. said check valve retainer assembly means includes a retainer member having a conically shaped inner end on which is operatively mounted said O-ring check valve for simultaneous engagement therewith and with said last mentioned valve seat when the O-ring check valve is in a normally closed position.

5. An interchangeable fluid flow control valve as defined in claim 4, wherein:

a. each of said valve seats on said valve seat member is formed with an angled valve seat face which is disposed at an acute angle from a plane perpendicular to the axis of said check valve retainer assembly means, and in a direction so as to be divergently disposed with the conical inner end of said check valve retainer member.

6. An interchangeable fluid flow control valve as defined in claim 1, wherein said flow control needle valve assembly means includes:

a. a retainer member operatively mounted in the other of said valve chamber openings; and, b. a flow control needle valve adjustably mounted in said retainer member and having a needle valve nose operatively engaged with said respective end of said second flow passage means, for controlling fluid flow through said second flow passage means.

* * * * *

UNITED STATES PATENT OFFICE
CERTIFICATE OF CORRECTION

Patent No. 3,857,405              Dated   December 31, 1974

Inventor(s)   Robert J. Heideman

It is certified that error appears in the above-identified patent and that said Letters Patent are hereby corrected as shown below:

Title Page, Column 1, after the inventor's name and address, add the following:    "Assignee: Ace Controls, Inc.,
                                Farmington, Mich. 48024"

Signed and sealed this 1st day of April 1975.

(SEAL)
Attest:

RUTH C. MASON
Attesting Officer

C. MARSHALL DANN
Commissioner of Patents
and Trademarks